United States Patent
Watadani et al.

(10) Patent No.: US 7,636,221 B2
(45) Date of Patent: Dec. 22, 2009

(54) DISK DRIVE HEAD SUSPENSION HAVING RESILIENT REGION THICKER THAN A RIGID REGION

(75) Inventors: Eiji Watadani, Aikoh-gun (JP); Masao Hanya, Aikoh-gun (JP); Takumi Karasawa, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 285 days.

(21) Appl. No.: 11/404,480

(22) Filed: Apr. 13, 2006

(65) Prior Publication Data

US 2006/0232887 A1 Oct. 19, 2006

(30) Foreign Application Priority Data

Apr. 15, 2005 (JP) .............................. 2005-118451

(51) Int. Cl.
G11B 5/58 (2006.01)
(52) U.S. Cl. ............... 360/244.8; 360/244.9; 360/244.3
(58) Field of Classification Search .............. 360/244.8, 360/244.9, 244.3
See application file for complete search history.

(56) References Cited

U.S. PATENT DOCUMENTS

| | | | | |
|---|---|---|---|---|
| 4,734,805 A * | 3/1988 | Yamada et al. | ........... | 360/244.8 |
| 6,016,239 A * | 1/2000 | Mizuno et al. | ........... | 360/246.3 |
| 6,307,715 B1 * | 10/2001 | Berding et al. | ........... | 360/244.8 |
| 6,741,424 B1 * | 5/2004 | Danielson et al. | ........ | 360/244.9 |
| 6,765,759 B2 | 7/2004 | Bhattacharya et al. | | |
| 7,136,260 B2 * | 11/2006 | Oh et al. | ................... | 360/244.8 |
| 7,209,325 B2 * | 4/2007 | Boutaghou et al. | ....... | 360/244.2 |
| 2007/0188926 A1 * | 8/2007 | Kushima | ................. | 360/244.8 |

FOREIGN PATENT DOCUMENTS

JP 9-282624 10/1997

* cited by examiner

Primary Examiner—Jefferson Evans
(74) Attorney, Agent, or Firm—Jordan and Hamburg LLP

(57) ABSTRACT

A head suspension for a hard disk drive is capable of improving shock property of the hard disk drive while miniaturizing the hard disk drive. A head suspension has a base plate to be attached to a carriage and turned around a spindle of the carriage, a load beam which includes a beam and a hinge, a base end of the beam being supported to the base plate through the hinge and which applies a load onto a head for writing and reading data to and from a disk at a front end side thereof, and a flexure which connects the head to writing and reading wires and supports the head and which is attached to the load beam, where the hinge is set to be relatively thicker than the beam so that the load beam is made thin and the load is increased.

6 Claims, 9 Drawing Sheets

Fig.3
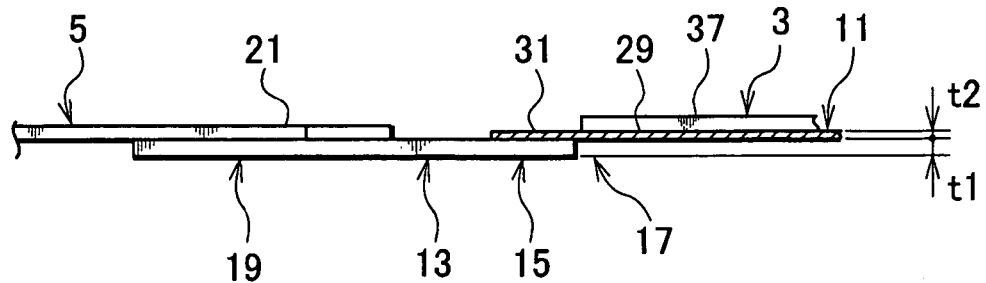
Fig.4
| Beam Thickness [um] | Hinge Thickness [um] | G Lift off [G/gf] |
|---|---|---|
| 35 | 25 | 357.2 |
| 30 | 25 | 386.0 |
| 25 | 25 | 419.1 |
| 20 | 25 | 462.3 |
Fig.5
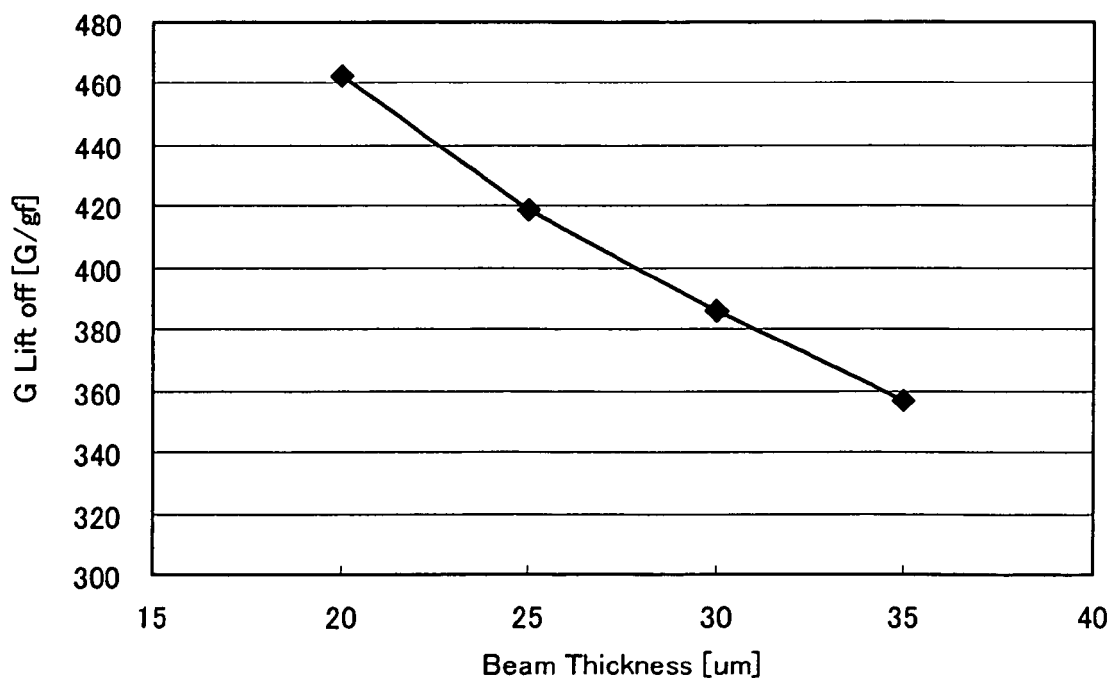

Acceleration at front end of 2.5-inch arm (B1 : 1.3kHz)

Acceleration at front end of 1-inch arm (B1 : 3.5kHz)

DISK DRIVE HEAD SUSPENSION HAVING RESILIENT REGION THICKER THAN A RIGID REGION

BACKGROUND OF THE INVENTION

1. Field of the Invention

The present invention relates to a head suspension of a hard disk drive incorporated in an information processor such as a personal computer.

2. Description of the Related Art

A head suspension of a hard disk drive includes a load beam, a head supported with the load beam, and a slider attached to the head. The head suspension has a shock property that determines a lift-off of the slider from the surface of a hard disk when a shock is applied. The shock property of the head suspension is dependent on the weight of the load beam.

For example, a first head suspension has a load beam having a thickness (t) of 51 μm, a length (lL) of 7 mm, and a gram load of 2.5 gf that is applied by the load beam to a head, and a second head suspension has a load beam having a thickness (t) of 30 μm, a length (lL) of 5.5 mm, and a gram load of 2.5 gf. If a shock of 1 msec duration (1 msec in half wavelength) is applied to these head suspensions, a slider of the first head suspension lifts at an acceleration of 628 G and a slider of the second head suspension lifts at an acceleration of 1103 G.

FIG. 13 and FIG. 14 show a relationship between lift-off G of a head suspension and lift-off G of a hard disk drive, in which FIG. 13 is a graph showing the result of a 2.5-inch hard disk drive and in which FIG. 14 is a graph showing the result of a 1-inch hard disk drive.

The shock property of the head suspension is expressed with the magnitude of a shock at which a slider of the load beam of the head suspension is lifted from the surface. The shock property of the head suspension is referred to as "lift-off G" indicative of the magnitude of the shock that causes a lift-off of the slider. The "lift-off G" is also indicative of the shock property of the hard disk drive.

In the 2.5-inch hard disk drive of FIG. 13, shock input including two kinds of waveforms, one having a half wavelength with 1 msec duration and the other having a half wavelength with 0.4 msec duration is applied. In the 1-inch hard disk drive of FIG. 14, shock input including three kinds of waveforms, one having a half wavelength with 2 msec duration, another having a half wavelength with 1 msec duration, and the remaining having a half wavelength with 0.4 msec duration is applied.

In the 2.5-inch hard disk drive of FIG. 13, even if the lift-off G of the head suspension is increased, the lift-off G of the hard disk drive does not increase so much. In the 1 msec duration, a slope thereof is y≈0, and in the 0.4 msec duration, a slope thereof is y=0.27.

On the other hand, in the 1-inch hard disk drive with a small size of FIG. 14, when the lift-off G of the head suspension is increased, the lift-off G of the hard disc drive increases evenly. In the 2 msec duration, a slope thereof is y=0.90, in the 1 msec duration, a slope thereof is y=0.85, and in the 0.4 msec duration, a slope thereof is y=0.81.

FIG. 15 and FIG. 16 is respectively a graph showing a change of generated acceleration to shock input at a front end of an arm to which a head suspension attached according to a time change. An abscissa indicates time and an ordinate indicates acceleration. The data shown in FIG. 15 relates a 2.5-inch hard disk drive and the data shown in FIG. 16 relates to a 1-inch hard disk drive. In FIGS. 15 and 16, magnitude of shock input is set to have 0.4 msec duration and 200 G.

As is apparent from FIG. 15 and FIG. 16, the 2.5-inch hard disk drive generated an arm action larger than that in the 1-inch hard disk drive. Therefore, in the 2.5-inch hard disk drive, the shock property of the hard disk drive is largely dependent on not only the weight of the head suspension but also the arm action. In contrast, in the 1-inch hard disk drive, the shock property of the hard disk drive is hardly dependent on the arm action and it is mainly dependent on the weight of the head suspension.

Thereby, in a miniaturized hard disk drive such as a 1-inch hard disk drive, it has been found that the shock property of the hard disk drive can be improved by only increasing the lift-off G of the head suspension.

Accordingly, to improve the shock property of a head suspension in the miniaturized hard disk drive, thinning a load beam of the head suspension to reduce weight is effective.

FIG. 17 is a perspective view showing a head suspension 101 according to a related art. The head suspension 101 has a base plate 103, a load beam 105 integrated with the base plate 103, and a flexure 107 supported to the load beam 105. The load beam 105 includes a rigid part or beam 109 and a resilient part or hinge 111.

FIG. 18 is a partly sectioned view showing an example of a hard disk drive in which the head suspensions 101 of FIG. 17 are arranged. As shown in FIG. 18, for example, the base plate 103 of the head suspension 101 is attached to an arm 115 of a carriage 113 by swaging.

The carriage 113 is turned around a spindle 119 by a positioning motor 117 such as a voice coil motor. A head 121 of the head suspension 101 is moved to a target track on a disk 123 according to pivoting of the carriage 113 around the spindle 119.

When the disk 123 rotates at high speed, the head 121 slightly floats from the disk 123 against gram load.

In such a head suspension 101 including the load beam 105 integrated with the resilient part, the load beam 105 with a length $l_L$ is made thin as countermeasure considering such a weight as described above.

However, the load beam 105 made thin in order to improve the shock property, the resilient part 111 becomes thin together with the load beam. This causes higher stress acting on the resilient part 111, so that it is impossible to increase a spring load for determining the gram load as the load applied onto the head 121 to a certain value or more.

On the other hand, there is a head suspension including a rigid part and a resilient part separated from and fixed to the rigid part. According to the head suspension, the resilient part is made thinner than the rigid part in order to set the resilient part to a low spring constant and secure rigidity of the rigid part. When the load beam is made thin entirely in order to improve the shock property while keeping the relationship between the thicknesses of the rigid part and resilient part, the resilient part is also made thin. It is impossible to increase a spring load to a certain value or more like the above case.

To solve the problem, expanding a width of a base end side of the load beam 105, namely, a width of the resilient part 111 is effective.

FIG. 19 is a plan view showing a hard disk drive 125 in which the head suspension 101 of FIG. 17 is incorporated.

As shown in FIG. 19, the head suspension 101 is installed in the hard disk drive 125 for example. The hard disk drive 125 has the arms 115, a wire 127, disks 123, and the like. When a width B of the base end side of the load beam is expanded, the width of the arm 115 to which the head suspension 101 is attached is also expanded. This results in overlapping of the arm 115 with the disk 123 or interference thereof with the wire 127 in plan view of FIG. 19. Overlapping the arm 115 with the disk 123 involves a risk that the arm 115 and the disk 123 come in contact with each other due to shock input. Therefore, the overlapping of the arm 115 with the disk 123 and interference of the arm 115 with the wire 127 must be avoided.

Even if the width B of the base end side of the load beam 105 is expanded such that the arm 115 of the head suspension 101 does not overlap with the disk 123 or it does not interfere with the wire 127, it prevent the hard disk drive 125 from miniaturizing. The related art mentioned above is disclosed in Japanese Unexamined Patent Application Publication H09-282624.

SUMMARY OF THE INVENTION

An object of the present invention is to solve the problem of a head suspension, having a thin load beam to satisfy required shock property, that requires an extension of a width of a base end side of the load beam to increase a spring load of the resilient part.

In order to accomplish the object, an aspect of the present invention provides a head suspension having a rigid part and resilient part whose thickness being set to be relatively greater than that of the rigid part in order to make a load beam thin and increase a spring load of the resilient part, and allow miniaturization of a hard disk drive.

Accordingly, the spring load of the resilient part can be increased while the shock property of the head suspension being maintained without extensions of a base end side of the load beam. The hard disk drive can be miniaturized while the shock property thereof being improved.

BRIEF DESCRIPTION OF THE DRAWINGS

FIG. 3 is a partly sectioned side view partly showing the head suspension of FIG. 2;

FIG. 4 is a list showing a relationship among a thickness of a beam (rigid part) of a load beam of the head suspension, a thickness of a hinge (resilient part) of the load beam, and shock property of the head suspension according to the first embodiment;

FIG. 5 is a graph based on the list of FIG. 4;

DETAILED DESCRIPTION OF EMBODIMENTS

Head suspensions according to embodiments of the present invention will be explained in detail.

Each embodiment sets a resilient part of a head suspension to be relatively thicker than that of a rigid part of the head suspension, to miniaturize a hard disk drive while improving shock properties of the head suspension and the hard disk drive.

First Embodiment

Figure 1:
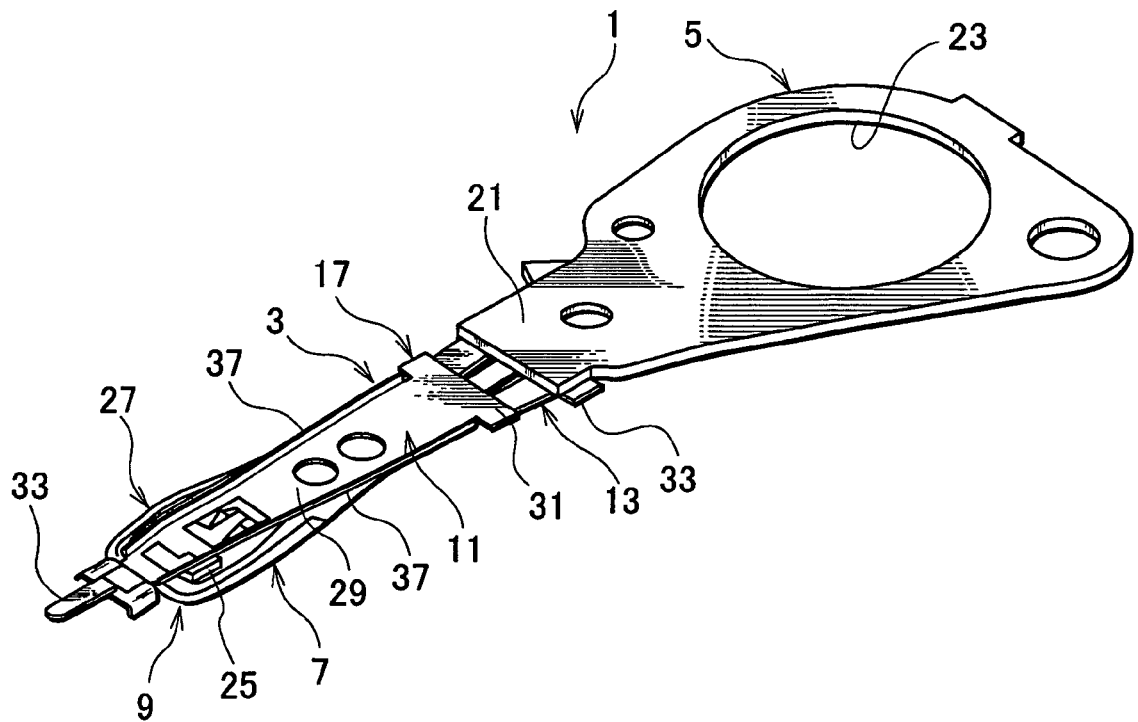
FIG. 1 is a perspective view showing a head suspension according to a first embodiment of the present invention.
Figure 2:
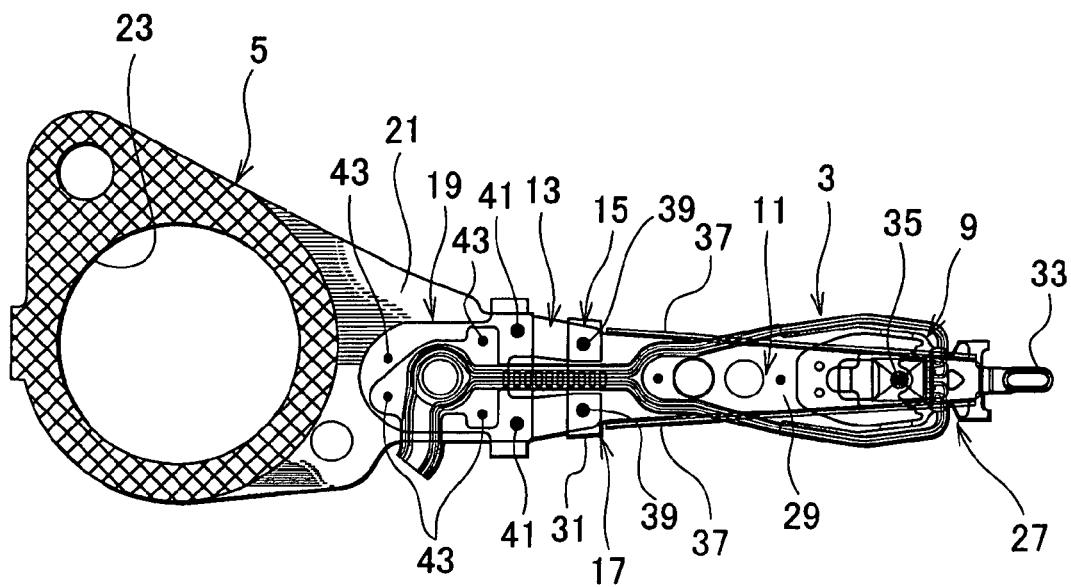
FIG. 2 is a plan view showing the head suspension of FIG. 1.

FIG. 1 and FIG. 2 show a head suspension according to a first embodiment of the present invention, in which FIG. 1 is a perspective view and FIG. 2 is a plan view.

The head suspension 1 shown in FIGS. 1 and 2 is for 1-inch size, for example. The head suspension has a load beam 3, an arm 5, and a flexure 7.

The load beam 3 applies a load onto a head 9. The head 9 is arranged at a front end of the load beam 3, to write and read data to and from the disk. The load beam 3 includes a beam 11 serving as a rigid part and a hinge 13 serving as a resilient part.

The hinge 13 is prepared separately from the beam 11. A first end 15 of the hinge 13 is fixed and supported to a base end 17 of the beam 11, while a second end 19 of the hinge 13 is fixed and supported to the arm 5.

The arm 5 includes an integral base plate 21 serving as a base for supporting the second end 19 of the hinge 13. The arm 5 has a fitting hole 23 to be fitted to a carriage of the hard disk drive, so that the head suspension 1 may turn around a spindle of the carriage.

The flexure 7 includes a conductive thin plate made of, for example, a resilient stainless-steel rolled plate (SST). On the thin plate, an insulating layer is formed. On the insulating layer, wiring patterns are formed. The flexure 7 is fixed to the beam 11 by, for example, laser welding. One end of the wiring patterns are electrically connected to write and read terminals supported on a slider 25 of the head 9. The other end of the wiring patterns are extended toward the arm 5.

The beam 11 is made of, for example, a nonmagnetic SUS304 (Japanese Industrial Standard) stainless-steel plate. The beam 11 extended from a front end 27 to the base end 17 is generally narrow. The beam 11 includes a main body 29 with a joint 31 at an end of the main body 29. The joint 31 is connected to the first end 15 of the hinge 13. Each side edges of the joint 31 in an across-the-width direction are constituted as remaining cut portions which is cut along the same when a plurality of beams are formed from a plate material. The front end 27 of the beam 11 has a load/unload tab 29. In vicinity of the front end 27, the beam 11 has a dimple 35.

Each side edge of the main body 29 in an across-the-width direction of the beam 11 has a rail 37 that is formed by box-bending the side edge of the beam 11 in a thickness direction of the beam 11. The rail 37 is extended along the side edge of the main body 29.

The hinge 13 is made of, for example, a resilient SUS301 (Japanese Industrial Standard) stainless-steel plate. The hinge 13 is divided into two branches to have in a bifurcated shape in the plan view of FIG. 2. The bifurcated shape of the hinge 13 is for reducing or eliminating a step formed between the arm 5 and the load beam 3 when the flexure 7 is extended from the main body 29 side of the load beam 3 to the base plate 21 side of the arm 5.

The first end 15 of the hinge 13 is fixed to the joint 31 of the beam 11 in the across-the-width direction at weld spots 39 by, for example, laser welding. The second end 19 of the hinge 13 is fixed to the base plate 21 at weld spots 41 and 43 by, for example, laser welding.

FIG. 3 is a partly sectioned side view partly showing the head suspension of FIG. 2. As shown in FIG. 3, the head suspension 1 is set a thickness t1 of the hinge 13 to be relatively larger than a thickness t2 of the beam 11. This configuration is effective to thin the load beam 3 and improve a spring load of the hinge 13. The spring load determines the gram load as the load applied onto the head 9. According to the first embodiment, the thicknesses t1 and t2 are set to 25 μm and 20 μm, respectively.

The thicknesses t1 and t2 may be optionally set based on a hard dirk drive in which the head suspension 1 is installed, provided that the thickness t1 of the hinge 13 is greater than the thickness t2 of the beam 11 to thin the load beam 3 and improve the spring load of the hinge 13.

FIG. 4 is a list showing a relationship among a beam thickness, a hinge thickness, and shock property of a head suspension, and FIG. 5 is a graph based on the list of FIG. 4. The shock property of the head suspension is expressed with the magnitude of a shock at which a slider of the load beam is lifted from the surface of a disk. The phenomenon that a slider of a load beam lifts off from the surface of a disk in response to the application of a shock is referred to as "G-lift-off." The "G-lift-off" is also indicative of the magnitude of the shock that causes a lift-off of the slider. Further, the "G-lift-off" is also indicative of the shock property of the hard disk drive.

In FIGS. 4 and 5, the thickness t1 of the hinge 13 is fixed at 25 μm, and the thickness t2 of the beam 11 is changed as 35, 30, 25, and 20 μm. In response to these reductions in the thickness, the head suspension 1 increases its G-lift-off as 357.2 G/gf, 386.0 G/gf, 419.1 G/gf, and 462.3 G/gf.

When the thickness t2 of the beam 11 is 20 μm that is smaller than the thickness t1 of the hinge 13 of 25 μm, the head suspension 1 greatly improves its G-lift-off as shown in grayed cells in the table of FIG. 4.

Figure 6:
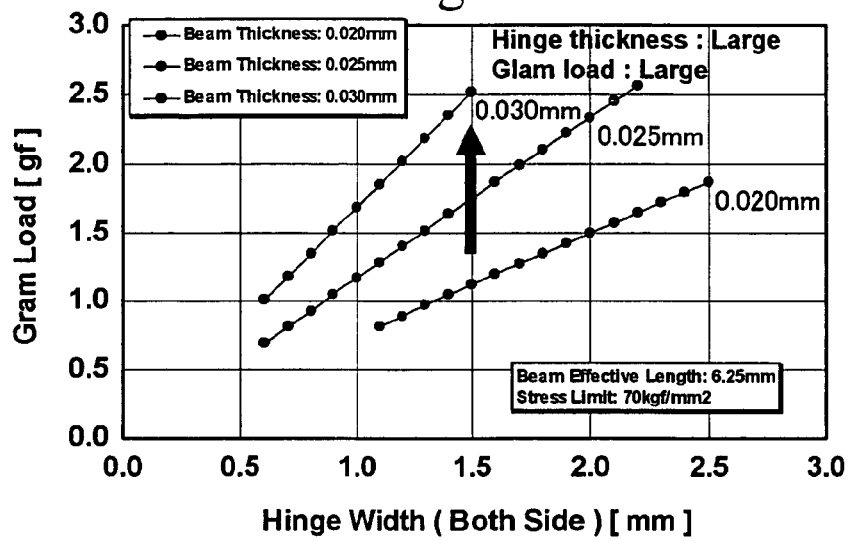
FIG. 6 is a graph showing a relationship between a gram load and a width of the hinge (hinge width) measured on load beams having different thicknesses (beam thickness) according to the first embodiment.
Figure 7:
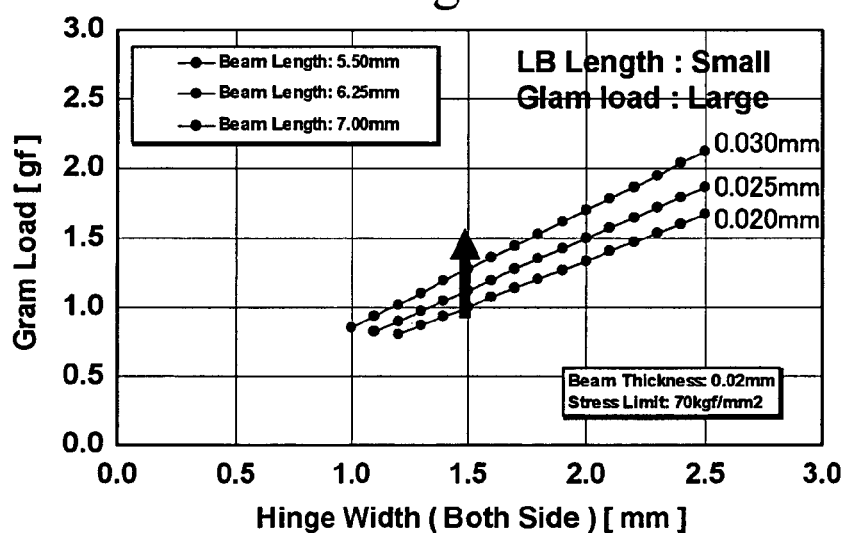
FIG. 7 is a graph showing a relationship between the gram load and the width of the hinge measured on load beams having different lengths according to the first embodiment.
Figure 8:
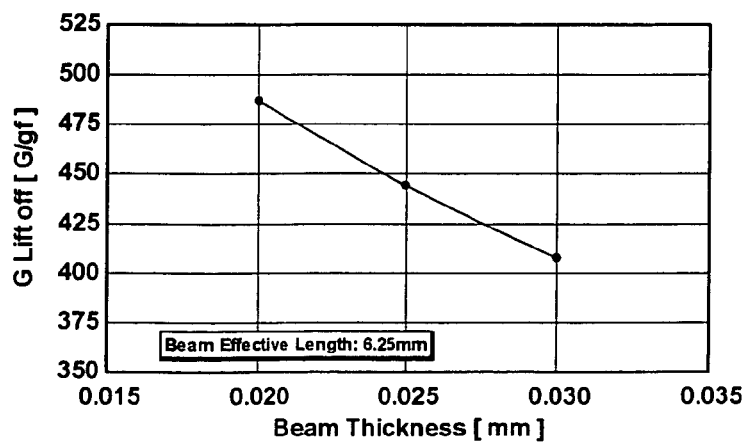
FIG. 8 a graph showing a relationship between the thickness of a load beam and a lift-off level (G-lift-off) according to the first embodiment.

FIGS. 6 to 8 are graphs showing test results that verify that thinning a beam thinner than a hinge improves the shock property of a head suspension.

FIG. 6 shows a relationship between the width of a hinge and a gram load measured on load beams having different thicknesses. An abscissa indicates the width of a hinge (hinge width), and an ordinate indicates gram load. The load beams shown in FIG. 6 each include a beam and a hinge that are integral with each other. The load beams have thicknesses of 20 μm, 25 μm, and 30 μm, respectively, a length (lL) of 6.25 mm, and a stress limit of 70 kgf/cm² because each is made of SUS304.

If a width allowed for a hinge is 2.0 mm, the hinge may be drilled to have a hole to realize an effective width of, for example, 1.2 mm. If a hinge has an effective width of 1.5 mm and a thickness of 20 μm which is equal to the thickness of a load beam, a limit gram load applied by the hinge is 1.5 gf as shown in FIG. 6. A hinge having an increased thickness of 30 μm and an effective width of 1.2 mm can achieve a gram load of 2.0 gf.

FIG. 7 is a graph showing a relationship between the width of a hinge and a gram load measured on load beams having different lengths. An abscissa indicates the width of a hinge, and an ordinate indicates gram load. The load beams shown in FIG. 7 have lengths of 5.50 mm, 6.25 mm, and 7.00 mm, respectively, a thickness (t) of 20 μm, and a stress limit of 70 kgf/cm² because each is made of SUS304.

As is apparent in FIG. 7, changes in the length of a load beam only slightly influence the gram load of the load beam.

It is understood from FIGS. 6 and 7 that the thickness, not length, of a load beam greatly influences a gram load applied by the load beam. Namely, a narrow load beam for a miniaturized hard disk drive must have a thick of the hinge.

FIG. 8 is a graph showing a relationship between the thickness of a load beam and a lift-off level (G-lift-off). An abscissa indicates the thickness of a load beam and an ordinate indicates G-lift-off.

It is clear in FIG. 8 that the thicker the load beam, the poorer the G-lift-off or shock property of the load beam.

From FIGS. 6 to 8, it is apparent that the hinge must be thick and the beam must be thin to secure a high G-lift-off level and a high gram load.

For this, the first embodiment makes the thickness t1 of the hinge 13 thicker than the thickness t2 of the beam 11, to thereby thin the load beam 3A and increase the resilience of the hinge 13. As a result, the head suspension 1A of the second embodiment can secure a high G-lift-off level and a high gram load.

In generally, a load beam is made of SUS304 as nonmagnetic stainless-steel material in order to avoid electrically affecting on the head 9. According to the first embodiment, the hinge 13 is separated from and connected to the beam 11. Therefore, SUS301 as resilient stainless-steel material whose magnetism is stronger than that of SUS304 can be used as material for the hinge 13, as described above.

Figure 9:
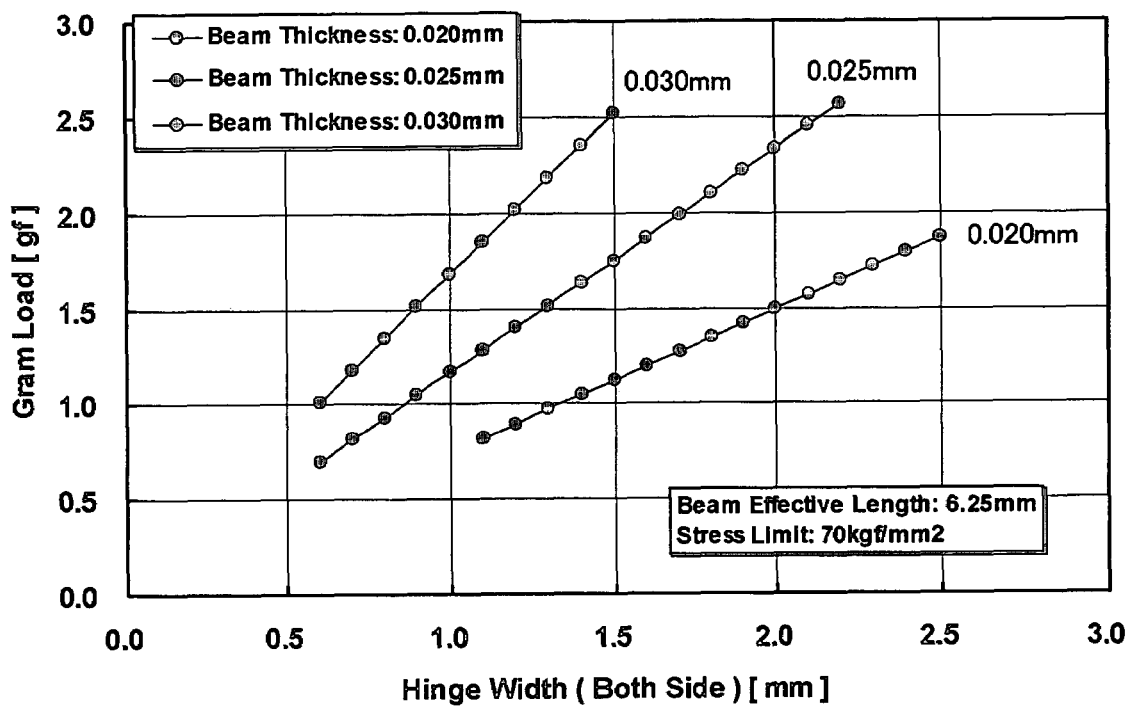
FIG. 9 is a graph showing a relationship between a gram load and a width of the hinge according to the first embodiment.
Figure 10:
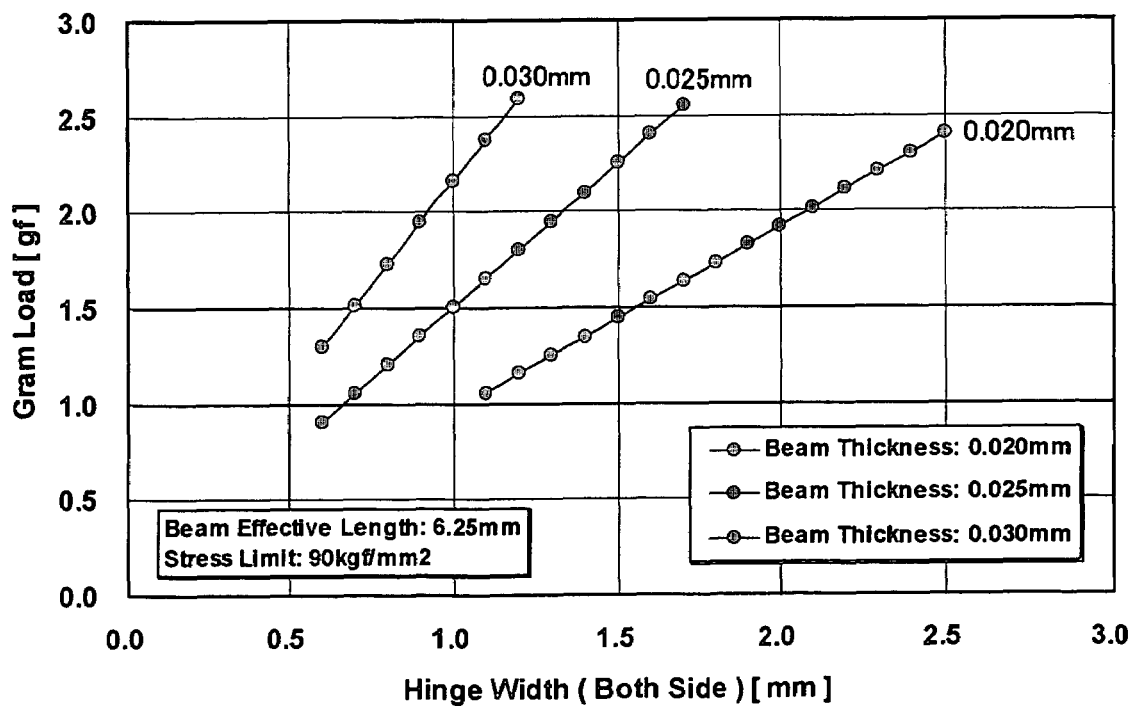
FIG. 10 is a graph showing a relationship between the gram load and the width of the hinge according to the first embodiment.

FIG. 9 is a graph showing a relationship between a gram load and a width of a hinge made of SUS304, while FIG. 10 is a graph showing a relationship between a gram load and a width of a hinge made of SUS301. In FIGS. 9 and 10, an abscissa indicates a hinge width and an ordinate indicates a gram load. In FIGS. 9 and 10, a load beam has a beam and a hinge integrated with the beam. The length of the load beam is set to 6.25 mm, and the thickness thereof is set to 20 μm, 25 μm, and 30 μm. According to the head suspension of FIG. 9, the stress limit is 70 kgf/cm². According to the head suspension of FIG. 10, the stress limit was 90 kgf/cm².

When the hinge width is 1.2 mm and the hinge thickness is 25 μm, the limit of the gram load is 1.4 gf according to the head suspension of FIG. 9. In contrast, the limit of the gram load is 1.8 gf in the same condition as FIG. 9 according to the head suspension of FIG. 10.

Therefore, the first embodiment separates the hinge 13 from the beam 11 and applies SUS301 as material of the hinge 13 in addition to the thickness setting, so that it is possible to realize high spring load of the hinge 13. When the spring load is constant, the hinge width can be made further narrow, and the spring constant can be reduced.

When only the shock property of the head suspension is taken into consideration, it is advantageous to shorten the load beam. However, the length of the load beam influences frying height characteristic. Accordingly, when the frying height characteristic is taken into consideration, a head suspension must be maintained the load beam in a certain length. Although the length of the load beam, therefore, is selected optionally, the load beam can not be shortened extremely. In general, a head suspension having a load beam with a length of 7 mm is used in a 2.5-inch hard disk drive, and a head suspension having a load beam with a length of 6.25 mm is used in a 1-inch hard disk drive.

According to the first embodiment, even if the load beam 3 with a length of 6.25 mm is used in the 1-inch hard disk drive, the required shock property of the head suspension 1 can be satisfied because the hinge thickness influences the gram load largely as compared with the load beam length as apparent from FIGS. 6 and 7.

In this way, the head suspension 1 of the first embodiment has the rigid part or beam 11 and the resilient part or hinge 13 whose thickness is relatively greater than that of the beam 11 so as to thin the load beam 3 and increase the spring load of the hinge 13. With this configuration having no extension of the base end side of the beam 11 in the across-the-width direction, the first embodiment can increase the spring load to maintain the G-lift-off of the head suspension 1, while miniaturizing the hard disk drive and improving the G-lift-off of the hard disk drive.

Second Embodiment

Figure 11:
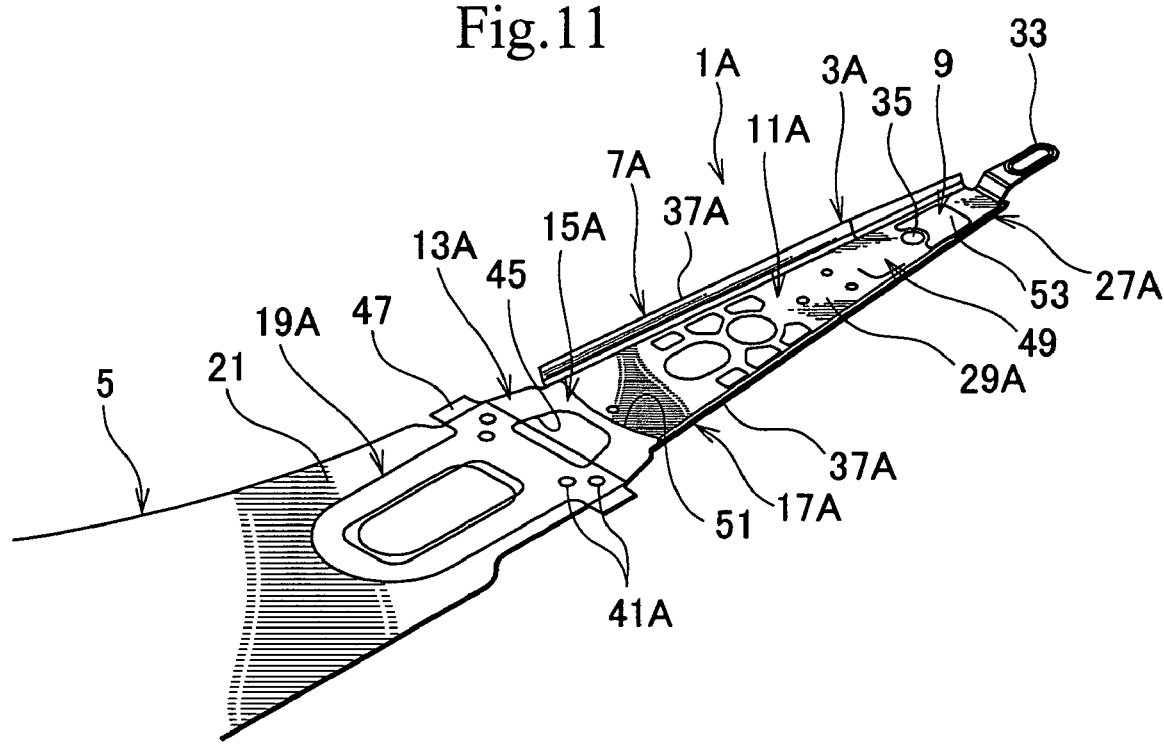
FIG. 11 is a perspective view showing a head suspension according to a second embodiment of the present invention.
Figure 12:
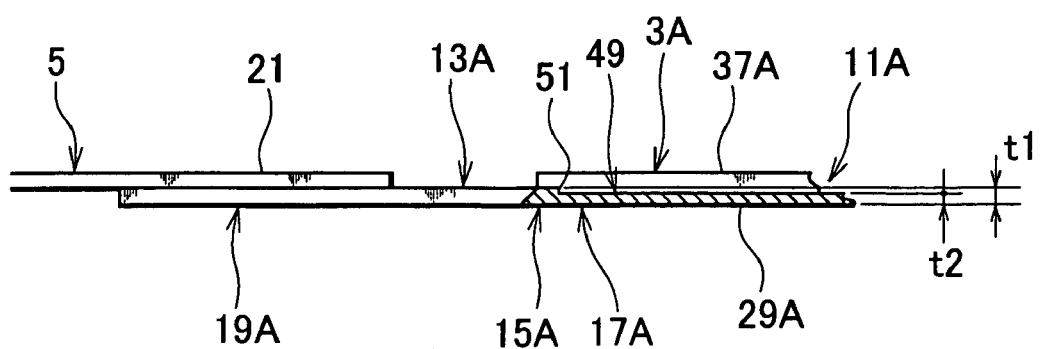
FIG. 12 is a partly sectioned side view partly showing the head suspension of FIG. 11.
Figure 13:
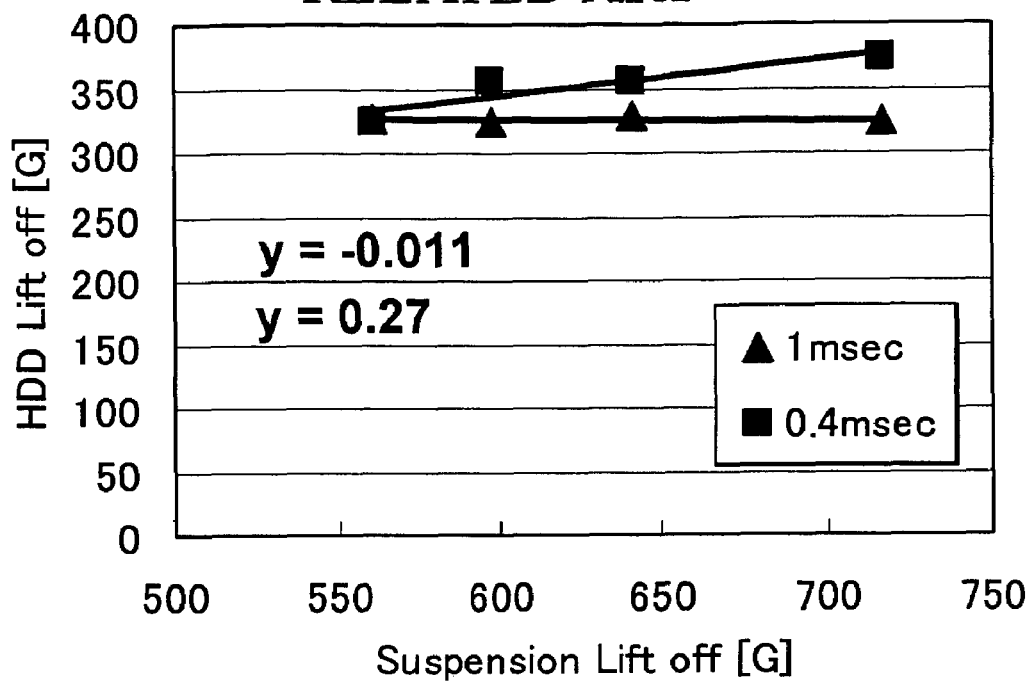
FIGS. 13 and 14 are respectively a graph showing a relationship between lift-off G of a head suspension and lift-off G of a hard disk drive according to a related art.
Figure 14:
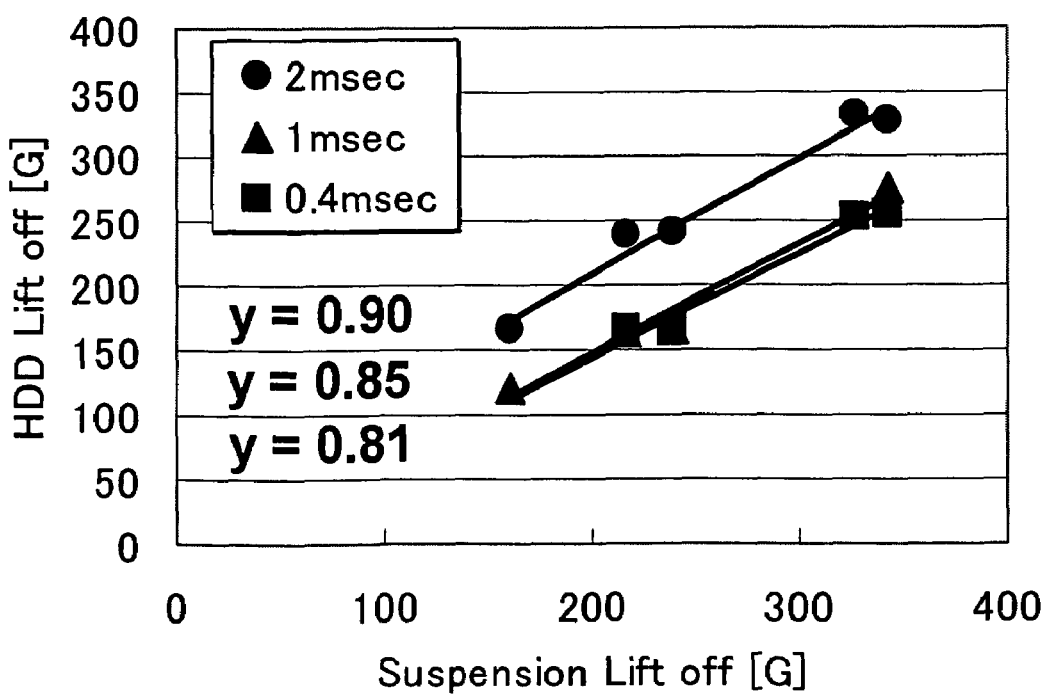
Figure 15:
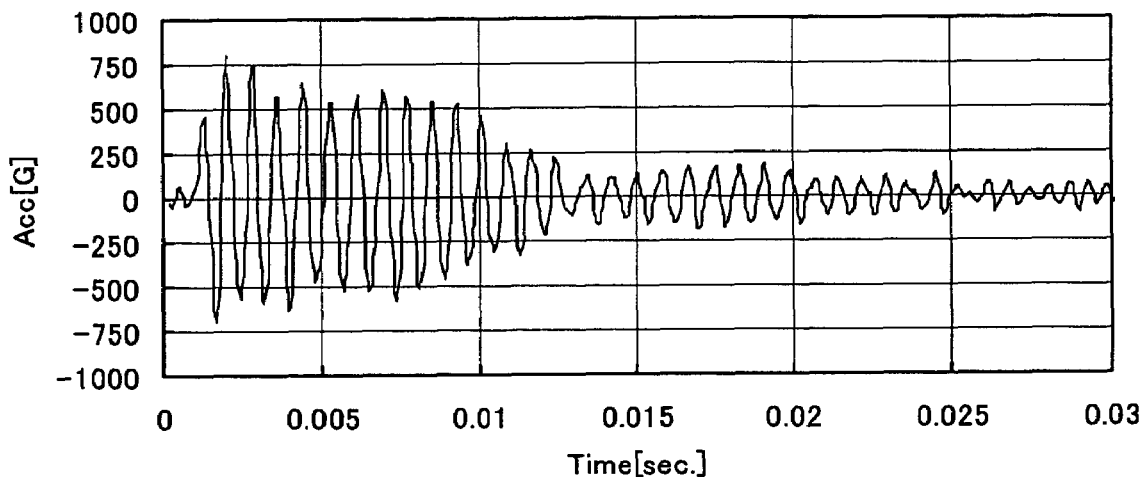
FIGS. 15 and 16 are respectively a graph showing a change of a generation acceleration when shock is input into a front end of an arm of the hard disk drive to which the head suspension according to a related art is attached.
Figure 16:
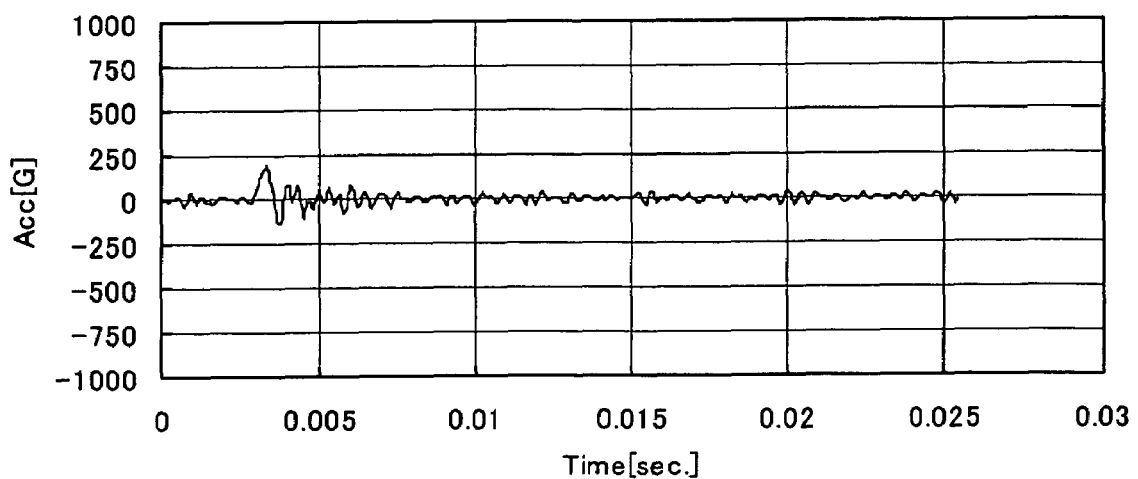
Figure 17:
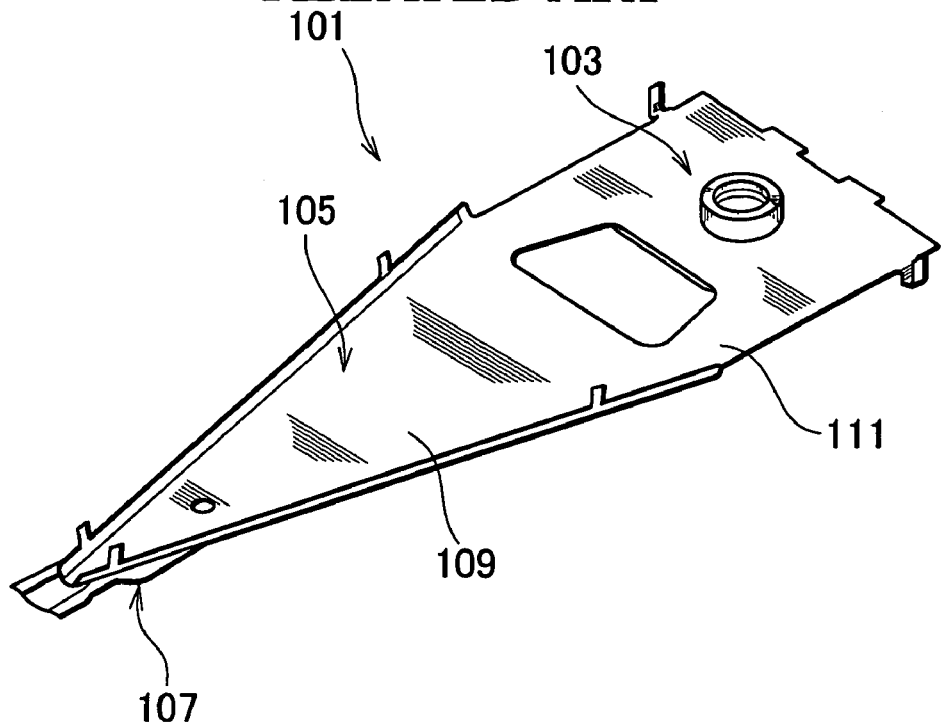
FIG. 17 is a perspective view showing a head suspension according to a related art.
Figure 18:
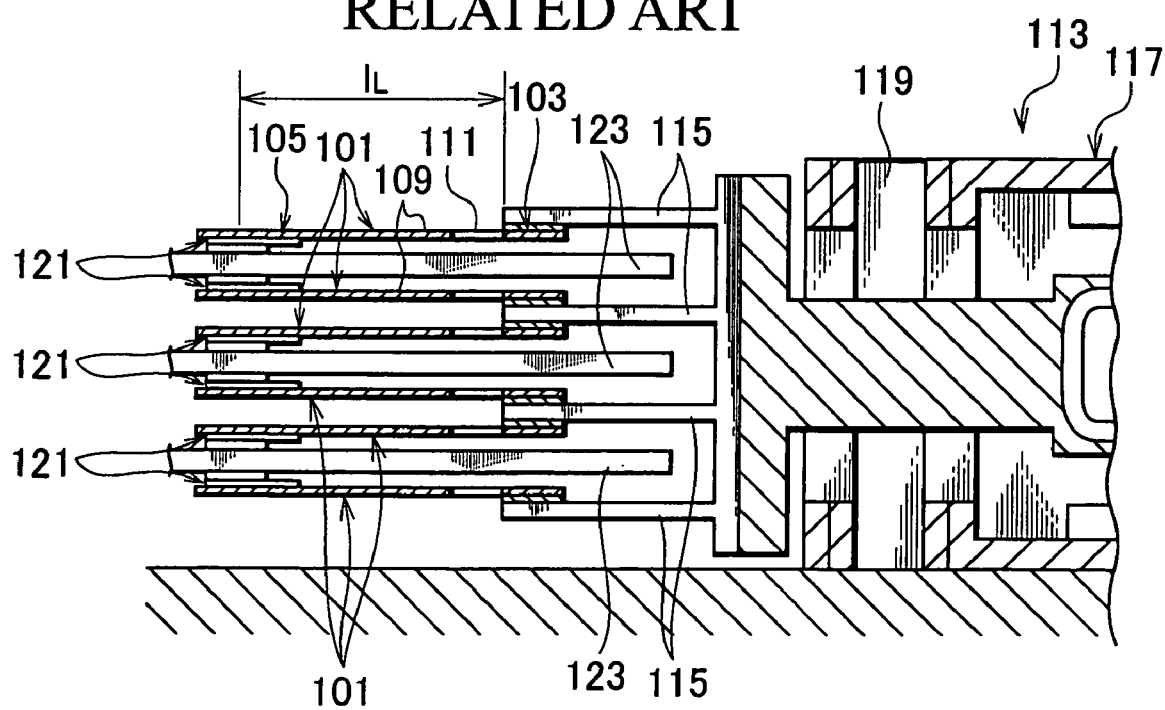
FIG. 18 is a partly sectioned view showing an example of a hard drive disk drive in which the head suspension of FIG. 17 is installed.
Figure 19:
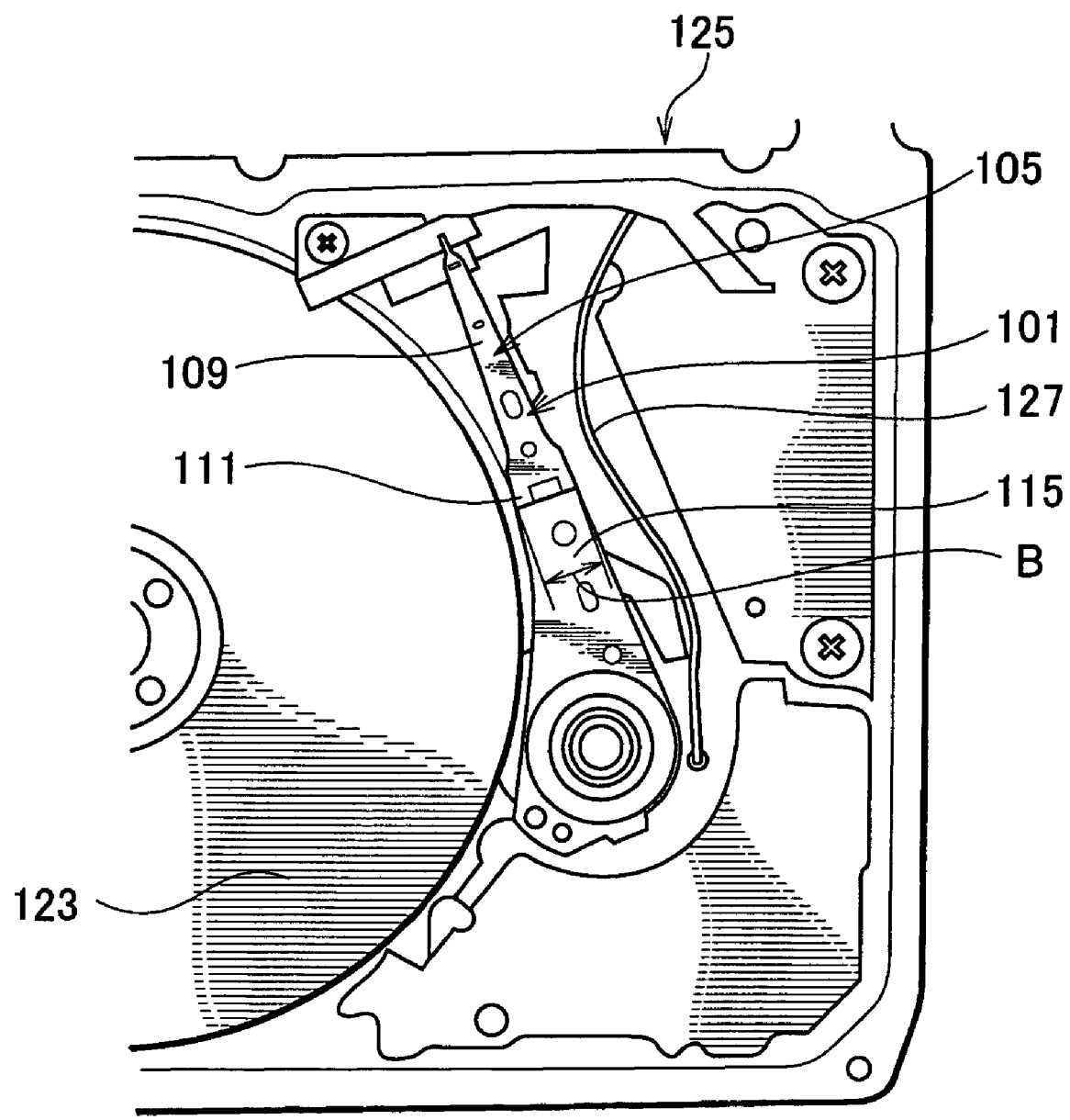
FIG. 19 is a plan view partly showing the hard disk drive of FIG. 18.

FIGS. 11 and 12 show a head suspension 1A according to a second embodiment of the present invention, in which FIG. 11 is a perspective view and FIG. 12 is a partly sectioned side view of FIG. 11. Parts of the second embodiment that are the same as those of the first embodiment are represented with the same reference numerals or the same reference numerals plus "A".

As shown in FIGS. 11 and 12, the head suspension 1A has a load beam 3A which supports a head 9A. The load beam 3 includes a beam 11A and a hinge 13A integrated with the beam 11A. In this case, the load beam 3A is made of SUS304 which does not electrically affect on the head 9A.

Each side edge in an across-the-width direction of the beam 11 has a rail 37A. The rail 37A is extended from a front end to a base end of the beam 11A along the side edge to reach a first end 15A of the hinge 13A. Therefore, longitudinal stiffness of the load beam 3A is increased and the property of the head suspension 1A is improved.

Even in the second embodiment, a thickness t1 of the hinge 13A is set to be relatively larger than a thickness t2 of the beam 11A so that the load beam 3A is made thin and the spring load of the hinge 13A is increased. In the second embodiment, t1 is set to 25 μm and t2 is set to 20 μm. An area, having the thickness t2, of the beam 11A is spread from a base end part 51 of beam 11A adjacent to the hinge 13A to a position 53 short of a tab 33 of the beam 13A in an extending direction of the beam 11A and is spread between the side edges in the across-the-width direction of the load beam 11A.

Setting the thickness t2 of the beam 11A is performed by partial etching the beam 11A, for example.

Accordingly, even in the second embodiment, operation and effect similar to those in the first embodiment can be achieved.

In the second embodiment, the number of parts can be reduced.

What is claimed is:

1. A head suspension, comprising:
a base to be attached to a carriage of a hard disk drive and turned around a spindle of the carriage, the base having an arm;
a load beam including a rigid part and a resilient part, to apply load onto a head that is arranged at a front end of the load beam to write and read data to and from a disk arranged in the hard disk drive, a base end of the rigid part being connected to the resilient part, and the resilient part being supported by the arm; and
a flexure having read/write wiring patterns connected to the head, the flexure supporting the head and attached to the load beam;
wherein each of the rigid part and the resilient part is made from a same single layer plate, and a thickness of the single layer plate at the resilient part is set to be relatively greater than a thickness of the single layer plate at the rigid part so that part of the load beam is made thin and part of the load beam has an increased spring load.

2. The head suspension of claim 1, wherein:
the resilient part is made from material of SUS301 as resilient stainless-steel material.

3. The head suspension of claim 1, wherein: the rigid part is formed by partial etching so that a thickness of the resilient part is set to be relatively greater than that of the rigid part.

4. A head suspension, comprising:
a base to be attached to a carriage of a hard disk drive and turned around a spindle of the carriage, the base having an arm;
a load beam including a rigid part and a resilient part, to apply load onto a head that is arranged at a front end of the load beam to write and read data to and from a disk arranged in the hard disk drive, a base end of the rigid part being connected to the resilient part, and the resilient part being supported on the arm; and
a flexure having read/write wiring patterns connected to the head, the flexure supporting the head and attached to the load beam; wherein
each of the rigid part and resilient part is made of a plate having a single layer,
a thickness of the resilient part is set to be relatively greater than that of the rigid part, and
the resilient part is non-integral to the rigid part and has a rigidity higher than that of the rigid part.

5. A head suspension, comprising:
a base to be attached to a carriage of a hard disk drive and turned around a spindle of the carriage, the base having an arm;
a load beam including a rigid part and a resilient part, to apply load onto a head that is arranged at a front end of the load beam to write and read data to and from a disk arranged in the hard disk drive, a base end of the rigid part being connected to the resilient part, and the resilient part being supported by the arm; and
a flexure having read/write wiring patterns connected to the head, the flexure supporting the head and attached to the load beam; wherein
the rigid part and the resilient part are separate plates each having a single layer, the rigid part plate connected to the resilient part plate, and
a thickness of the plate of the resilient part is set to be relatively greater than the thickness of the plate of the rigid part.

6. A head suspension, comprising:
a base to be attached to a carriage of a hard disk drive and turned around a spindle of the carriage, the base having an arm;
a load beam including a rigid part and a resilient part, to apply load onto a head that is arranged at a front end of the load beam to write and read data to and from a disk arranged in the hard disk drive, a base end of the rigid part being connected to the resilient part, and the resilient part being supported by the arm; and a flexure having read/write wiring patterns connected to the head, the flexure supporting the head and attached to the load beam; wherein:

each of the rigid part and resilient part is made of a plate having a single layer, a thickness of the resilient part is set to be relatively greater than that of the rigid part so as to thin the load beam and increase the load applied onto the head, and the resilient part is non-integral to the rigid part, the resilient part is made from material of SUS301 as resilient stainless-steel material, and the rigid part is made of SUS304 stainless-steel material.

* * * * *